(12) United States Patent
Sjoberg et al.

(10) Patent No.: US 10,352,363 B2
(45) Date of Patent: Jul. 16, 2019

(54) CONE CRUSHER, BEARING PLATE, AND KIT OF BEARING PLATES

(71) Applicant: SANDVIK INTELLECTUAL PROPERTY AB, Sandviken (SE)

(72) Inventors: Patrik Sjoberg, Sandviken (SE); Mauricio Torres, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/179,298

(22) Filed: Jun. 10, 2016

(65) Prior Publication Data

US 2016/0281786 A1 Sep. 29, 2016

Related U.S. Application Data

(62) Division of application No. 14/006,130, filed on Sep. 19, 2013, now Pat. No. 9,388,855.

(51) Int. Cl.
| | |
|---|---|
| *F16C 33/10* | (2006.01) |
| *F16C 37/00* | (2006.01) |
| *B02C 2/04* | (2006.01) |
| *F16C 33/02* | (2006.01) |

(52) U.S. Cl.
CPC ............. *F16C 37/00* (2013.01); *B02C 2/04* (2013.01); *F16C 33/02* (2013.01)

(58) Field of Classification Search
CPC .... F16C 17/04; F16C 17/045; F16C 33/1065; F16C 33/107; F16C 37/00; F16C 37/002
See application file for complete search history.

(56) References Cited

U.S. PATENT DOCUMENTS

| | | | | |
|---|---|---|---|---|
| 2,362,667 A | * | 11/1944 | Schmidt | F04D 5/001 269/55 |
| 3,026,051 A | | 3/1962 | Saari | |
| 3,473,743 A | | 10/1969 | Winter | |
| 3,913,989 A | * | 10/1975 | Williams | F16C 17/045 384/123 |
| 4,728,201 A | * | 3/1988 | Abbe | F16C 17/045 384/100 |

(Continued)

FOREIGN PATENT DOCUMENTS

| | | |
|---|---|---|
| CA | 1235679 A1 | 4/1988 |
| CN | 85201588 U | 5/1986 |

(Continued)

*Primary Examiner* — Phillip A Johnson
(74) *Attorney, Agent, or Firm* — Corinne R. Gorski

(57) ABSTRACT

A gyratory cone crusher includes a first and a second crushing shell defining a crushing gap. The first crushing shell is arranged to gyrate around a vertical axis, in order to crush material entering the crushing gap, and is vertically supported by a thrust bearing including first and second bearing plates defining a spherical sliding interface. One of the bearing plates has one or more cooling and/or lubricating grooves at the sliding interface, each groove defining a channel, extending from the center of the sliding interface to the periphery thereof. In order to obtain a uniform distribution of grooves, the cooling/lubricating grooves are in the form of one or more spirals extending from the center of the sliding interface to the periphery thereof. The disclosure further relates to a bearing plate and a kit of bearing plates involving such a bearing plate.

6 Claims, 4 Drawing Sheets

(56) References Cited

U.S. PATENT DOCUMENTS

| | | | |
|---|---|---|---|
| 4,789,250 A * | 12/1988 | Schluter | F16C 17/04 384/305 |
| 2009/0279817 A1 | 11/2009 | Shimizu | |
| 2012/0020595 A1* | 1/2012 | Kim | F16C 17/035 384/105 |

FOREIGN PATENT DOCUMENTS

| | | | |
|---|---|---|---|
| CN | 101947475 A | 1/2011 | |
| GB | 2115079 A | 9/1983 | |
| WO | 199715396 A1 | 5/1997 | |
| WO | WO-2011024712 A1 * | 3/2011 | F16C 17/102 |

* cited by examiner (Prior art) Fig. 1

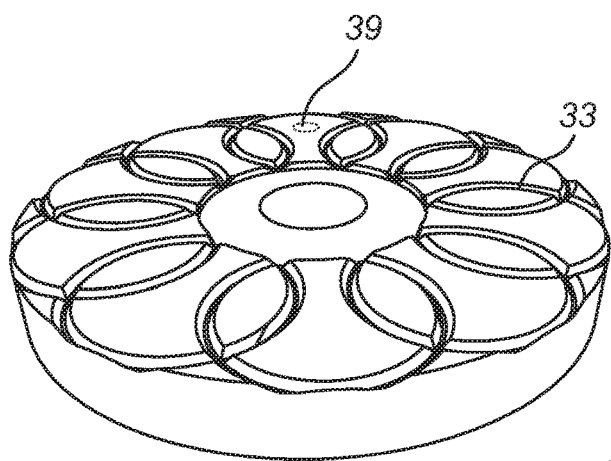
(Prior art) *Fig. 3a*
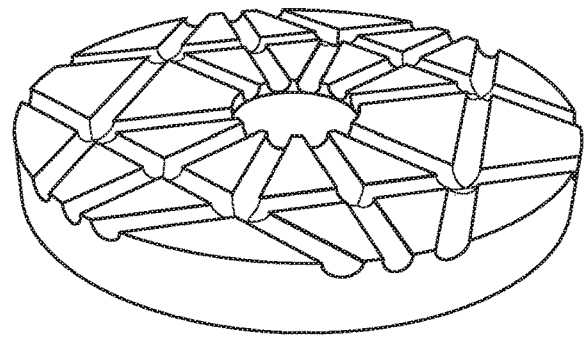
(Prior art) *Fig. 3b*
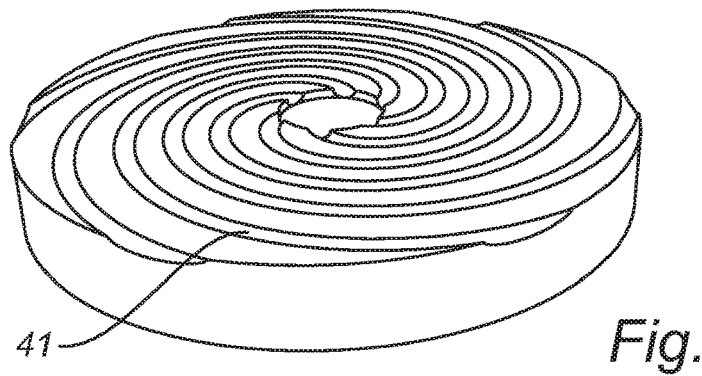
*Fig. 4*
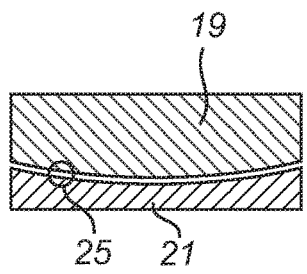
*Fig. 5A*
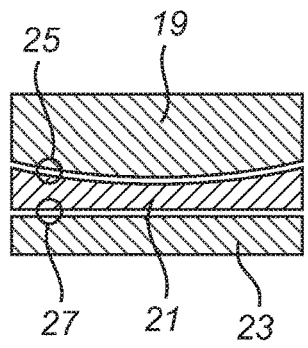
*Fig. 5B*
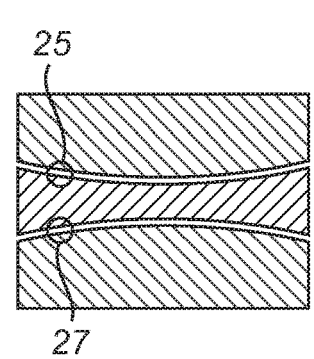
*Fig. 5C*

CONE CRUSHER, BEARING PLATE, AND KIT OF BEARING PLATES

RELATED APPLICATION DATA

This application is a divisional of U.S. patent application Ser. No. 14,006,130 filed Sep. 19, 2013, which is a § 371 National Stage Application of PCT International Application No. PCT/EP2012/052400 filed Feb. 13, 2012 claiming priority of EP Application No. 11160101.9, filed Mar. 29, 2011.

TECHNICAL FIELD

The present disclosure relates to a gyratory cone crusher comprising first and second crushing shells, which define a crushing gap. The first crushing shell is arranged to gyrate around a vertical axis in order to crush material entering the crushing gap, and is vertically supported by a thrust bearing, comprising first and second bearing plates, which define a spherical sliding interface. One of the bearing plates has one or more cooling/lubricating grooves at the sliding interface, each defining a channel, extending from a central portion of the sliding interface to the periphery thereof.

The disclosure further relates to a bearing plate and a kit of bearing plates for such a crusher.

BACKGROUND

Such a crusher is described in WO-97/15396-A1, which shows a crusher where the first crushing shell is attached to a gyrating vertical shaft, and where the thrust bearing supports this shaft.

Another example is illustrated in CA-1235679-A where a vertical shaft is fixed, and a crushing head, carrying the first shell, is arranged to gyrate around the shaft. A thrust bearing is arranged to support the crushing head on top of the shaft and includes both circular and radial lubrication channels. In both types of crushers, the thrust bearings are subjected to considerable forces and take up both gyratory and rotational movement.

One problem associated with both the above types of crushers is how to improve their reliability of operation. A malfunctioning crusher will not only imply costs of repair in the field, but also a considerable loss in terms of production time.

SUMMARY OF THE INVENTION

One object of the present invention is therefore to provide a crusher with improved reliability and/or reduced maintenance costs and a bearing plate or kit of bearing plates suitable therefore.

More specifically, a crusher of the initially mentioned kind then includes a bearing plate with cooling and/or lubricating grooves in the form of one or more spirals, which extend from the a central portion of the sliding interface and towards the periphery thereof. By using grooves in this form it is possible to obtain a uniform distribution of grooves over the entire bearing sliding interface without using branching of grooves. This implies that a desired cooling and/or lubricating function can be achieved over the sliding interface to avoid the emergence of "hot spots" in the thrust bearing causing excessive wear and ultimately a malfunction.

Therefore improved reliability and/or lowered maintenance costs can be achieved. Alternatively, a higher load can be allowed for a given maintenance level.

There may be a number of interleaved spirals such as in the range from 6 to 10.

The thrust bearing may comprise a third bearing plate, thus providing a second sliding interface, which also may comprise grooves in the shape of one or more spirals. The second sliding interface may be flat or spherical.

Each sliding interface in the thrust bearing may involve one bearing plate made of steel, and another which is made of bronze.

Such a thrust bearing may be used in a gyratory cone crusher where the first crushing shell is attached to a gyrating vertical shaft, and where the thrust bearing supports this shaft.

Alternatively, the thrust bearing may be used in a gyratory cone crusher comprising a fixed vertical shaft and a crushing head, carrying the first shell, wherein the crushing head is arranged to gyrate around the fixed vertical shaft. In such a case, the thrust bearing may be arranged to support the crushing head on top of the fixed vertical shaft.

BRIEF DESCRIPTION OF THE DRAWINGS

FIG. 3a shows a prior art bearing plate with circular cooling/lubrication grooves.
FIG. 3b shows a prior art bearing plate with star configured cooling/-lubrication grooves.
FIG. 4 illustrates a bearing plate according to an alternative of the present disclosure.
FIGS. 5A-5C illustrate different bearing plate configurations.

DETAILED DESCRIPTION

Figure 1:
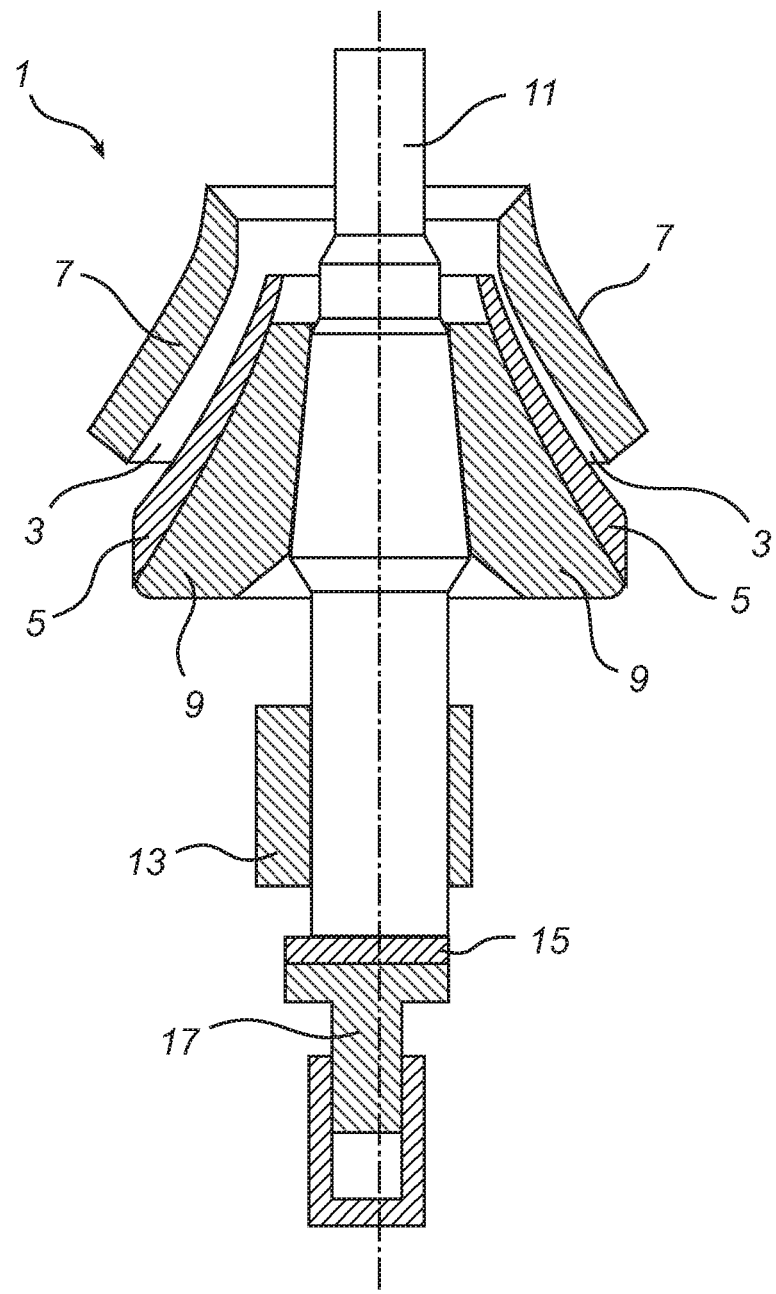
FIG. 1 illustrates schematically a gyratory cone crusher.

FIG. 1 illustrates schematically and in cross section a gyratory cone crusher. In the crusher 1, material to be crushed is introduced in a crushing gap 3 formed between a first crushing shell 5 and a second crushing shell 7. The first crushing shell 5 is fixedly mounted on a crushing head 9, which is in turn fixedly mounted on a vertical shaft 11. The second crushing shell 7 is fixedly mounted on the frame (not shown) of the crusher 1.

The vertical shaft 11, the crushing head 9, and the first crushing head performs a gyrating movement. A as a result of this movement, the crushing gap 3 is continuously reshaped. The two crushing shells 5, 7 approach one another along one rotating generatrix and move away from one another along another, diametrically opposed, generatrix. Where, the crushing shells approach one another, material is crushed, and where the crushing shells move away from one another, new material is let into the crushing gap.

There are different ways available for obtaining the above gyratory movement. In the illustrated case, an eccentric device 13 is rotatably arranged around the lower portion of the vertical shaft 11. A drive shaft (not shown) is arranged to rotate the eccentric device 13. The vertical shaft 11 is, at its upper end, carried by a top bearing (not shown) attached to the frame. When the eccentric device 13 is rotated, during operation of the crusher 1, the vertical shaft 11 and the crushing head 9 mounted thereon will perform the required gyrating movement. In addition to the gyrating movement, material being crushed will further cause the vertical shaft 11 to rotate in a direction opposite to the gyration.

The vertical shaft 11 is supported at its bottom end by a thrust bearing 15, which is very schematically illustrated in FIG. 1. The present disclosure relates to an improvement in this thrust bearing as will be discussed below. The thrust bearing 15 is a critical component, which must be capable of absorbing heavy axial loads, while allowing the gyration of the vertical shaft 11 as well as its rotation.

In the illustrated case, the thrust bearing 15 is supported by a piston 17 which allows the axial movement of the vertical shaft 11. Moving the shaft upwards, for instance, will reduce the overal width of the crushing gap 3, which implies a higher load and a more finely crushed output material.

Figure 2:
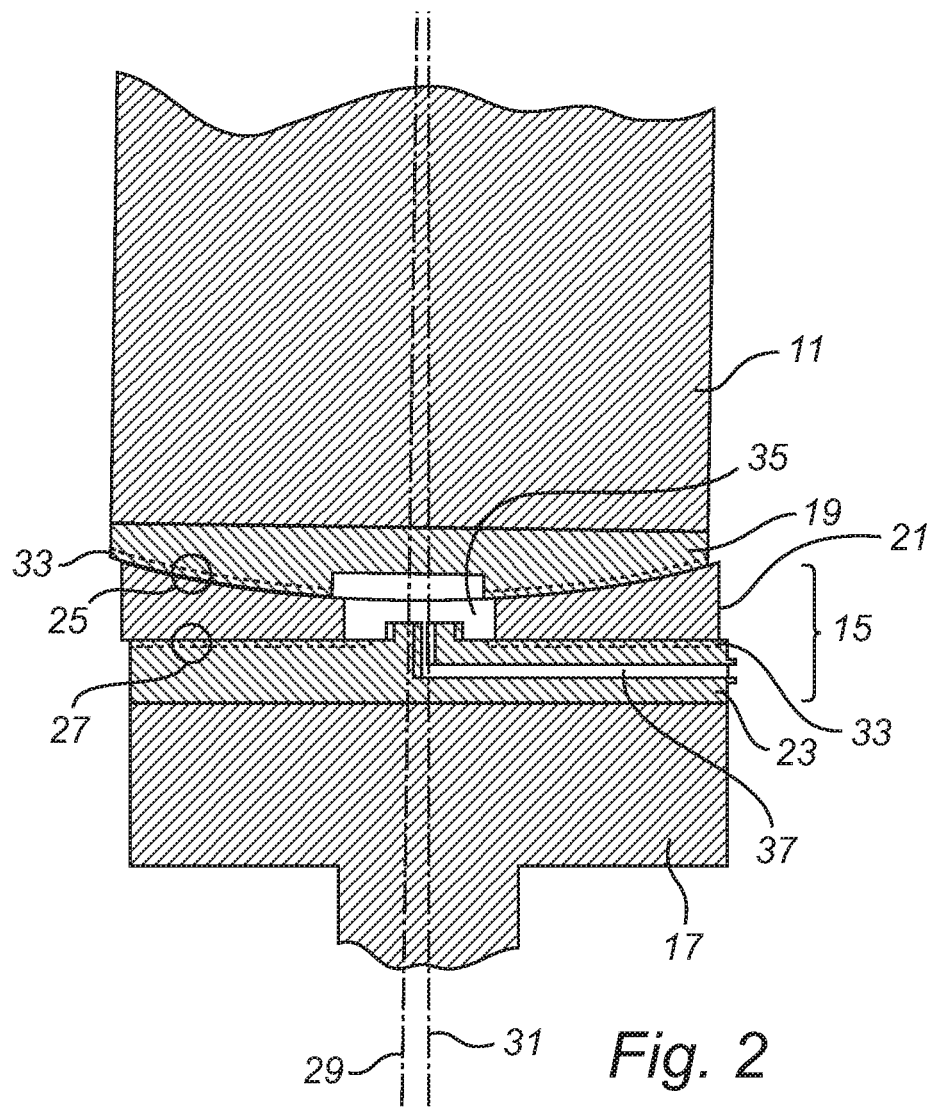
FIG. 2 shows a thrust bearing with three bearing plates.

FIG. 2 shows a thrust bearing 15, suitable for the crusher of FIG. 1, with three horizontal bearing plates 19, 21, 23. An upper bearing plate 19 is fixedly attached to the vertical shaft 11, and a lower bearing plate 23 is fixedly attached to the piston 17 of FIG. 1. An intermediate bearing plate 21 is place between the upper and lower bearing plates 19, 23, thereby creating one upper 25 and one lower 27 sliding interface. Typically, each of the upper and lower bearing plates 19, 23 may be made in a bronze alloy and the intermediate bearing plate 21 may be made in steel or cast iron, although a number of other configurations are possible as will be discussed later. By bronze is here meant a copper alloy, including additives such as tin, aluminum, manganese, etc.

The upper sliding interface 25 is spherical, the bottom surface of the upper bearing plate 19 being convex and the top surface of the intermediate bearing plate 21 being concave. The curvature of those surfaces approximately correspond to half the distance to the top bearing of the vertical shaft 11, such that the upper sliding interface 25 facilitates the gyration of the shaft, by dividing the motion sideways evenly between the sliding interfaces. In the state illustrated in FIG. 2, the vertical shaft 11 has gyrated such that the shaft axis 29 is displaced to the left, at the thrust bearing 15, relative to the center axis 31 around which it gyrates. The upper sliding interface 25 takes up half of this movement as well as most of the rotation while supporting the vertical shaft 11. The lower sliding interface 27, which is flat, allows for taking up some rotation of the vertical shaft 11 as well as a sliding motion sideways to take up the rest of the gyrating movement. Other configurations exist where both sliding interfaces are spherical, as will be discussed later.

As is indicated by dashed lines in FIG. 2, the upper and lower bearing plates 19, 23 are provided with cooling/lubrication grooves 33 at the upper and lower sliding interfaces 25, 27, respectively. FIG. 3a shows a perspective view of a bearing plate with circular cooling/lubrication grooves 33 in accordance with known art.

With reference again to FIG. 2, lubricating oil is fed to a cavity 35, formed in the center of the intermediate bearing plate 21, through a channel 37 in the lower bearing plate 23 and by means of a pump (not shown). Alternatively, oil may be fed through a channel (not shown) in the piston 17. This forces lubricating/cooling oil through the grooves 33, which grooves include openings at the cavity 35 and at the periphery of each bearing plate. This cools the bearing plates 19, 21, 23 and provides a lubricating film at the sliding interfaces 25, 27, thereby making the thrust bearing 15 functional.

Returning to FIG. 3a, the cooling/lubricating grooves 33 have conventionally been straight, tree-shaped or, as illustrated circular. The circular shape has a diameter sufficient to intersect both with the central cavity 35 and the outer periphery of the bearing plate, thereby providing groove inlets and outlets. When used in a thrust bearing the grooves form channels together with the smooth surface of the bearing plate on the other side of the sliding interface. As initially mentioned, such groove shapes may form hot spots, particularly in areas 39 where the distance to the closest groove is relatively long. This implies higher overall maintenance costs for the crusher and limits the maximum crusher load. When tree-shaped or similar groove shapes with forks are used, such as the star configuration of FIG. 3b, oil will usually take the route with lowest flow resistance, meaning that some branches will convey very little oil in an unpredictable fashion.

The present disclosure therefore suggests a crusher with an improved thrust bearing 15. This bearing includes at least one bearing plate having one or more lubricating/cooling grooves 41 in the form of a spiral, an example of which is shown in FIG. 4. The spiral grooves 41 extend from the center cavity of the bearing plate and to the periphery thereof.

This configuration results in a bearing plate where the lubricating/-cooling groove density can be much more uniform over the entire bearing plate surface, as compared to the configuration in FIG. 3a, without the grooves having forks of any kind.

While it is possible to have only one spiral groove, making several turns, it may be advantageous to use a plurality of interleaved spirals the inlets of which are evenly distributed around the center cavity, and the outlets of which are evenly distributed around the periphery of the bearing plate. This provides a lower flow resistance and a more equal cooling function over the entire surface of the bearing plate. In the illustrated case, six spirals are used, but six to ten is considered a suitable number of spirals.

By a spiral is here generally meant a curve that winds around a center while receding therefrom. There are a number of different types of spirals described in mathematical literature (Archimedean or involute spirals, Fermat's spirals, logarithmic spirals, hyperbolic spirals, etc.). While a most of those are conceivable in this context it should be noted that one or more Archimedean spirals, having constant spacing between successive turns, will provide a more or less radially uniform distribution of grooves, which may be preferred. However, if uniform cooling is emphasized, it may also be preferred to let the groove density increase slightly with the radius to compensate for the increasing temperature of the cooling medium (oil).

The spacing between adjacent grooves is suitably small enough to ensure that all positions on the smooth bearing plate surface, on the other side of the sliding interface face a groove at least once during a gyration with a minimum stroke size. While in FIG. 4 the spiral grooves 41 turn counter-clockwise on the path from the centre to the periphery, tracks turning clockwise are of course equally possible.

FIGS. 5A-5C illustrate different bearing plate kit configurations. FIG. 5A show a thrust bearing with a single sliding interface 25 which is created by a first 19 and a second 21 bearing plate. The first bearing plate has a convex surface at the interface 25 where the second bearing plate 21 has a concave surface, with the same surface curvature. In this case, the sliding interface should form a part of a sphere with a radius corresponding to the distance to the vertical shaft pivot point in order to bear the vertical load while taking up the gyration. This means that the size of the crushing gap 3 of FIG. 1 cannot easily be adjusted by moving the vertical shaft 11 upwards or downwards, as the said distance will then be changed. However, it is possible, instead, to make the outer, second crushing shell vertically moveable instead to allow adjusting of the crushing gap and thereby of the quality of the produced material. This is why this type of thrust bearing is typically useful in a crusher of the type not having a top bearing, which will be briefly discussed in connection with FIG. 6.

FIG. 5B illustrates a second option which corresponds to the thrust bearing of FIG. 2. In addition to the upper spherical sliding interface 25 a lower planar sliding interface 27 is used by addition of a third bearing plate 23. This configuration is particularly useful in a crusher as shown in FIG. 1, where the vertical shaft 11 is vertically adjustable in order to change the crushing gap 3 size. It may be advantageous to design the spherical upper interface 25 such that it has a curvature corresponding to a sphere with a radius about half the distance to the upper bearing. This implies that the gyratory motion of the vertical shaft will cause the bearing plates to be displaced a similar amount at both sliding interfaces.

If the distance to the top bearing deviates slightly from twice the radius of the curvature sphere, this only means that the gyratory movement will be slightly unevenly distributed between the interfaces. It is preferred to keep this distribution as even as possible, as this also makes the wear and temperature equal between the interfaces.

Further, this provides a similar level of lubrication and cooling to both interfaces, as it is, to a great extent, the gyratory motion that draws the lubricant from the spiral channels into the sliding interface, the rotary motion being comparatively slow.

FIG. 5C shows a third option where also a second sliding interface 27 is spherical, but bulging in the opposite direction as compared with the first interface 25, such that the intermediate bearing plate is slightly concave. This allows a more curved upper interface, which implies better self-adjusting properties, while still distributing the gyration evenly between the upper and lower interfaces.

Regardless of which configuration is used, a number of different options exist regarding which materials can be used in the bearing plates and at their surfaces, as well as regarding at which side of each sliding interface the cooling/lubricating grooves should be placed. For instance, in the configuration of FIG. 5B, the intermediate bearing plate 21 may be made of steel, as this bearing plate is bowl-shaped and may be subjected to substantial radial tensile stress during gyration. The upper and lower bearing plates 19, 23 may be made of a brass alloy, for instance Copper 80%, Lead 10% and Tin 10% (weight proportions), which has good heat transfer properties. The cooling/lubricating grooves may be formed in the upper and lower plates, or in the intermediate plate. If the grooves are formed in the intermediate plate only, it may be advantageous to offset the grooves in the upper and lower surfaces of the plate, in such a way that they are not aligned to any greater extent. This may be done e.g. by turning the pattern on one side a few degrees clockwise as compared to the pattern on the other side, such that one channel on one side ends between two channels on the other side, and improves the structural strength of the intermediate plate. Further, a more even heat distribution over the entire bearing plate is achieved.

Another option is to use upper, lower and intermediate bearing plates, which are all made of steel or cast iron, and wherein at least one surface in each sliding interface is provided with a friction reducing bearing alloy layer, e.g. en Cobalt based alloy such as STELLITE (Trademark), typically with a thickness up to a maximum of few millimeters. Other bearing alloys are conceivable in this context, such as a bronze alloy. The thermal expansion coefficients of the bearing plates may then be substantially the same, as long as the bearing alloy layer thickness is not too large.

Figure 6:
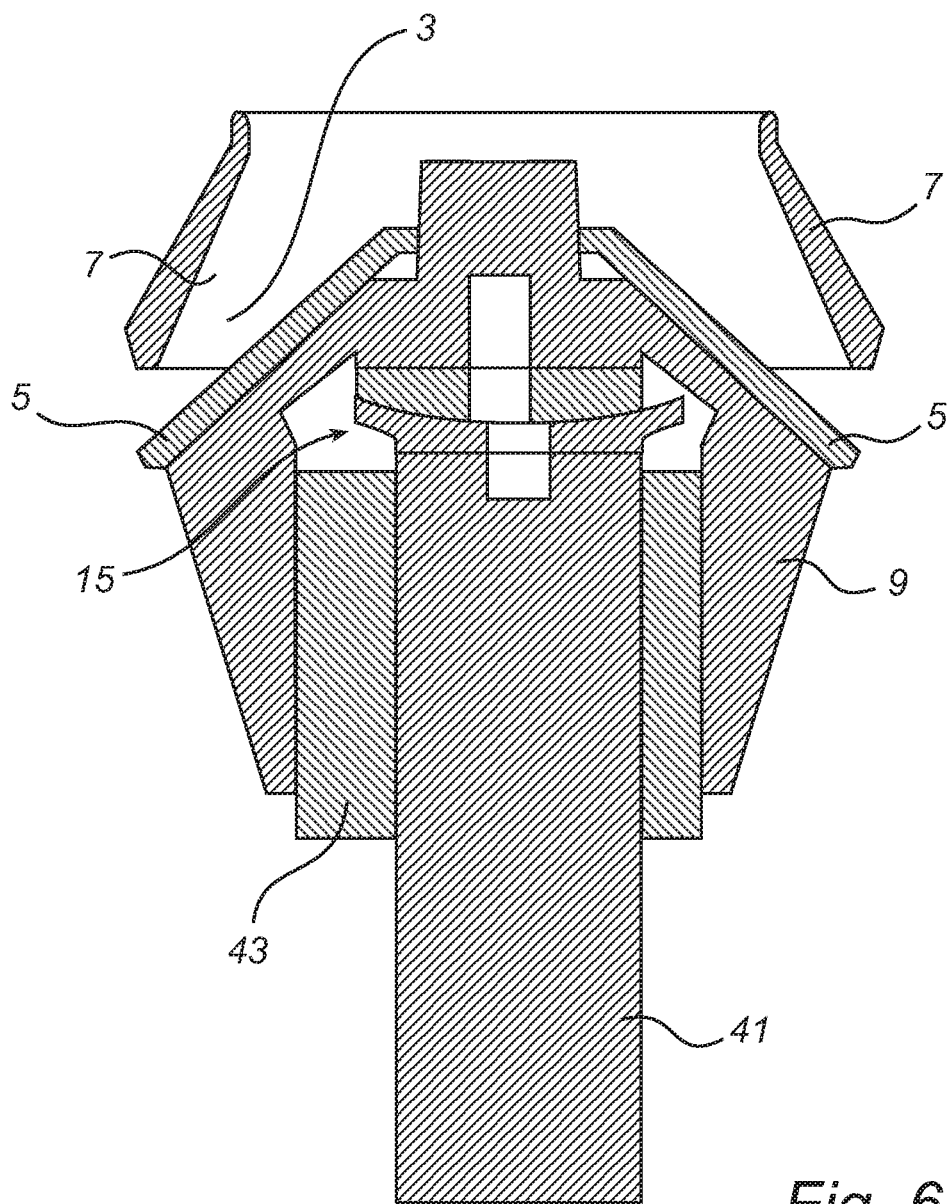
FIG. 6 illustrates schematically a gyratory cone crusher of a type not having a top bearing.

FIG. 6 illustrates schematically a gyratory cone crusher of a type not having a top bearing which will now be briefly described. This crusher type includes a vertical shaft 41 which does not gyrate, and may be fixedly attached to the crusher frame. To obtain the gyrating movement, the crushing head can gyrate around the vertical shaft 41 by rotating an eccentric device 43 radially placed between the shaft and the crushing head 9. The vertical shaft 41 supports the crushing head via a thrust bearing 15, which may be e.g. of the single sliding interface type shown in FIG. 5A. The crusher involves a first, inner crushing shell 5, supported by the crushing head 9, and a second, outer crushing shell 7, supported by the crusher frame, as in the crusher type described in connection with FIG. 1. To adjust the crushing gap 3, the outer crushing shell 7 may be vertically adjustable. As an alternative, the crushing head 9 may be vertically adjustable.

The invention is not restricted to the above-described examples and may be varied and altered in different ways within the scope of the appended claims. For instance, it should be noted that the term lubricating/cooling groove may refer to grooves providing both the effects of lubricating and cooling as well as either of those effects. Further, it is possible to provide additional cooling channels in for instance an intermediate bearing plate which channels are not directly connected to a sliding interface.

The invention claimed is:

1. A bearing plate for a gyratory cone crusher, the bearing plate comprising:
one or more cooling/lubricating grooves at a surface of a sliding interface, each of the grooves defining a channel extending from a central portion of the sliding interface and opening to a periphery thereof, the channel having a uniform width without any intersections or forks, wherein the cooling/lubricating grooves are one or more spirals extending from the central portion of the sliding interface and towards the periphery thereof and forming a uniform distribution of grooves over the sliding interface.

2. The bearing plate according to claim 1, wherein the cooling/lubricating grooves are interleaved spirals.

3. The bearing plate according to claim 2, further comprising 6 to 10 spirals.

4. The bearing plate according to claim 1, wherein each of the cooling/lubricating grooves defining the channel extend from an inlet at the central portion of the sliding interface to an outlet at the periphery thereof.

5. A bearing plate kit for a gyratory cone crusher comprising:
at least two bearing plates, each of the bearing plates including one or more cooling/lubricating grooves at a surface of a sliding interface, each of the grooves defining a channel extending from a central portion of the sliding interface and opening to a periphery thereof, the channel having a uniform width without any intersections or forks, wherein the cooling/lubricating grooves are one or more spirals extending from the central portion of the sliding interface and towards the periphery thereof and forming a uniform distribution of grooves over the sliding interface.

6. The bearing plate according to claim 5, wherein each of the cooling/lubricating grooves defining the channel extend from an inlet at the central portion of the sliding interface to an outlet at the periphery thereof.

* * * * *